United States Patent
Senatori (10) Patent No.: US 9,857,830 B2
(45) Date of Patent: Jan. 2, 2018

(54) HOUSING MEMBER OF A COMPUTING DEVICE

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/786,351

(22) PCT Filed: Jul. 31, 2013

(86) PCT No.: PCT/US2013/052849
§ 371 (c)(1),
(2) Date: Oct. 22, 2015

(87) PCT Pub. No.: WO2015/016855
PCT Pub. Date: Feb. 5, 2015

(65) Prior Publication Data
US 2016/0179136 A1    Jun. 23, 2016

(51) Int. Cl.
*G06F 1/16* (2006.01)
*B21D 22/02* (2006.01)

(52) U.S. Cl.
CPC ........... *G06F 1/1616* (2013.01); *B21D 22/02* (2013.01); *G06F 1/1656* (2013.01); *G06F 1/1662* (2013.01)

(58) Field of Classification Search
CPC .... G06F 1/1616; G06F 1/1662; G06F 1/1656; B21D 22/02
See application file for complete search history.

(56) References Cited

U.S. PATENT DOCUMENTS

| | | | |
|---|---|---|---|
| 5,865,546 A | 2/1999 | Ganthier et al. | |
| 6,351,372 B1 | 2/2002 | Kim | |
| 6,657,139 B2 | 12/2003 | Hasunuma | |
| 6,700,773 B1* | 3/2004 | Adriaansen | G06F 1/1618 345/156 |
| 6,736,323 B2* | 5/2004 | Hochgesang | H01H 13/70 235/475 |
| 6,771,490 B2 | 8/2004 | Peker et al. | |
| 7,907,393 B2 | 3/2011 | Sellers | |
| 8,341,832 B2 | 1/2013 | Theobald et al. | |
| 9,274,549 B1* | 3/2016 | Matsuoka | G06F 1/16 |

(Continued)

FOREIGN PATENT DOCUMENTS

| | | |
|---|---|---|
| JP | 2001-337739 | 12/2001 |
| TW | 200729257 | 8/2007 |
| TW | M418582 | 12/2011 |

*Primary Examiner* — Hoa C Nguyen
*Assistant Examiner* — Christopher L Augustin
(74) *Attorney, Agent, or Firm* — HP Inc Patent Department (57) ABSTRACT

Examples disclosed herein provide a base housing for a notebook computer. The base housing includes a single unitary housing member. The single unitary housing member includes a bottom portion and side walls that form a bottom surface and side walls of the base housing. The single unitary housing member includes a top portion that forms a top surface of the base housing, wherein the bottom portion, the top portion, and the side walls of the housing member are formed from a single piece of sheet metal.

12 Claims, 13 Drawing Sheets

(56) References Cited

U.S. PATENT DOCUMENTS

| | | | |
|---|---|---|---|
| 2006/0165465 A1* | 7/2006 | Wu | G06F 1/1616 |
| | | | 400/491 |
| 2007/0025072 A1 | 2/2007 | Liao | |
| 2009/0174678 A1* | 7/2009 | Mathew | G06F 1/1616 |
| | | | 345/173 |
| 2010/0091442 A1 | 4/2010 | Theobald et al. | |
| 2011/0038116 A1 | 2/2011 | Tseng | |
| 2012/0106076 A1* | 5/2012 | Senatori | G06F 1/1616 |
| | | | 361/679.55 |
| 2014/0053392 A1* | 2/2014 | Rothkopf | G06F 1/1637 |
| | | | 29/593 |
| 2015/0185770 A1* | 7/2015 | Martin | G06F 1/1616 |
| | | | 312/223.2 |

* cited by examiner

HOUSING MEMBER OF A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two housings connected together at a common end via one or more hinges, for example. In most cases, a first or display housing is utilized to provide a viewable display to a user while a second or base housing includes an area for user input (e.g., touchpad and keyboard).

DETAILED DESCRIPTION

In addition to designing notebook computers to be compact and light weight, other factors that may be considered are aesthetics and durability. In addition to considering the computing power and screen size of the notebook computer, among over factors, users may also consider the device appearance when making a selection.

Durability may also be considered due to the portable nature of notebook computers. Compared to desktop computers, which are normally stationary, notebook computers are usually transported by users and used in various places. As a result, notebook computers may be at higher risk for being inadvertently dropped or mishandled. This is particularly an issue for the base housing of the notebook computer, where a majority, if not all, of the internal components, such as electrical components, of the computer may be assembled within the base housing. As a result, the structural rigidity of the base housing may be considered, in an effort to protect the internal components.

In addition, often a user handles a notebook computer by holding the computer by the base housing, which may cause undue stress on the base housing since the weight of the computer is focused on the portion of the base housing held by the user. A challenge faced by designers of notebook computers is ensuring that notebook computers, particularly the base housing, is durable, structurally rigid, and aesthetically pleasing.

Examples disclosed herein provide a housing member of a base housing of a notebook computer that is structurally rigid. The rigidity of the housing member may allow for the notebook computer to withstand the wear and tear associated with handling a portable device. In addition, the housing member may go through a finishing process, where a finishing of the top and bottom surfaces of the base housing may match.

In one example, a portable computing device carp have a display housing and a base housing to which the display housing is rotatably connected. The base housing can include a single unitary housing member that forms a bottom surface, side walls, and a top surface of the base housing.

In another example, a base housing for a notebook computer can include a single unitary housing member. The single unitary housing member can include a bottom portion and side walls that form a bottom surface and side walls of the base housing. The single unitary housing member can include a top portion that forms a top surface of the base housing, wherein the bottom portion, the top portion, and the side walls of the housing member are formed from a single piece of sheet metal.

In yet another example, a method of forming a single unitary housing member of a computing device includes stamping a piece of sheet metal to form a bottom surface and side walls of the computing device. The method includes stamping a portion of the sheet metal to form a top surface of the computing device, wherein the e top surface includes a keyboard frame.

Figure 1:
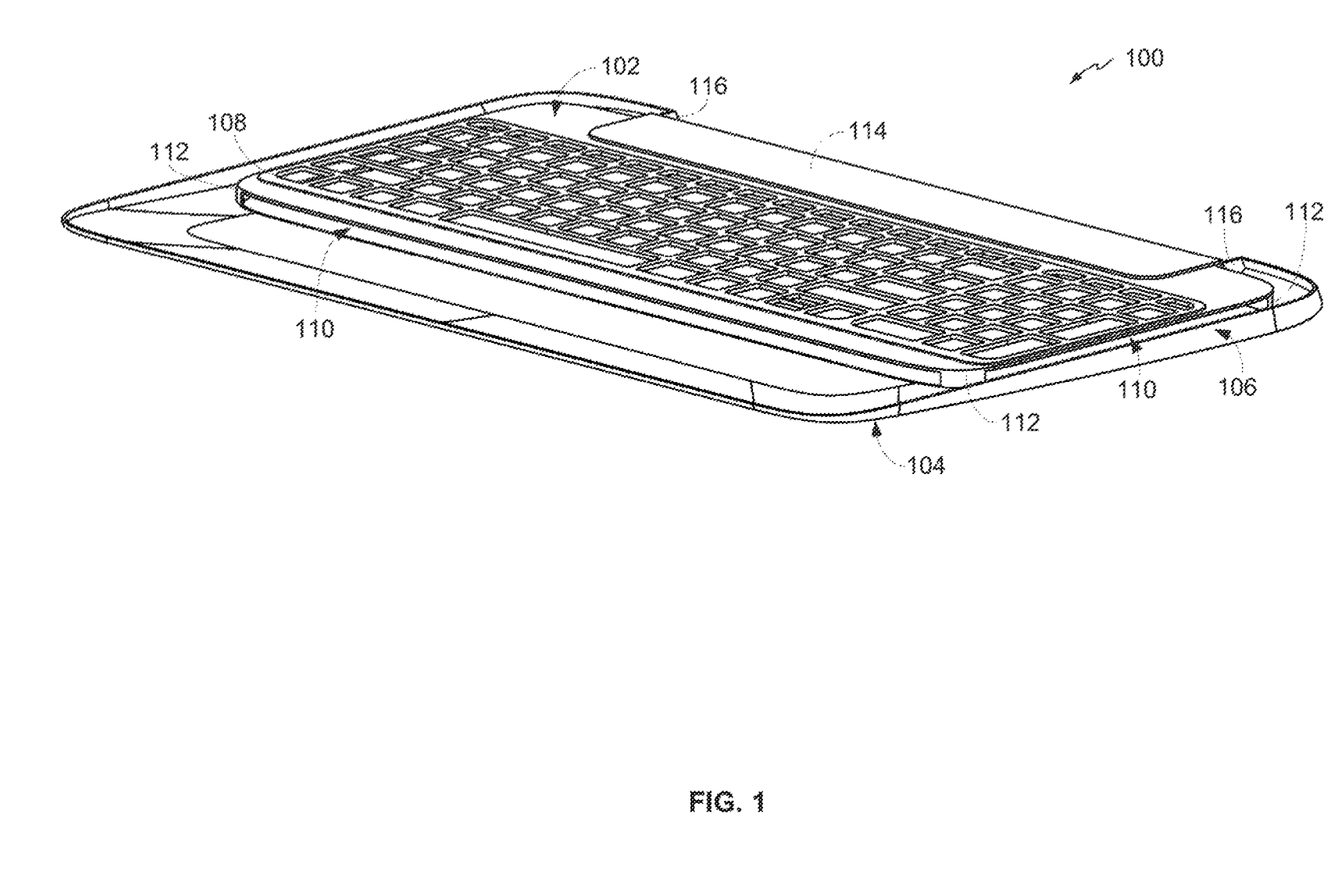
FIG. 1 illustrates a housing member that may be used in a base housing of a notebook computer, according to an example.

With reference to the figures, FIG. 1 illustrates a housing member 100 that may be used in a base housing of a notebook computer, according to an example. The housing member 100 may include a top surface 102 of the base housing, a bottom surface 104 of the base housing, and side walls 106 along a perimeter of the base housing. As will be further described, the housing member 100 may be formed from a single piece of sheet metal, resulting in the top surface 102, bottom surface 104, and side walls 106 to form the single unitary housing member 100. Using a single piece of sheet metal to form the top surface, bottom surface, and side walls of the base housing may offer a level of rigidity that is appropriate for portable computing devices. For example, by using the single unitary housing member 100 in a notebook computer, any force or stress applied to the base housing of the notebook computer may be distributed throughout the housing member 100.

Once the housing member 100 is incorporated into the base housing, the display housing of the notebook computer may be rotatably connected to the base housing at connection points 116 of the housing member 100 (e.g., via one or more hinges). The top surface 102 may include at least a keyboard lattice frame 108 and a speaker frame 114. In addition, the top surface 102, bottom surface 104, and side walls 106 may include a plurality of individual openings for various purposes, such as connector openings.

The top surface 102 may he elevated higher than the bottom surface 104 via vertical walls 112. The vertical walls 112 may allow for any force or stress applied to the base housing of the notebook computer to be distributed through at least the top surface 102 and bottom surface 104 of the housing member 100. The vertical walls 112 may form a cavity 110 below the top surface 102 that may be configured to enclose a plurality of components of the notebook computer. As an example, attachment features may be bonded within the cavity 110 for enclosing the components. The cavity may be enclosed by a service door (not shown) that is coplanar with the bottom surface 104 of the base housing.

Figure 2A:
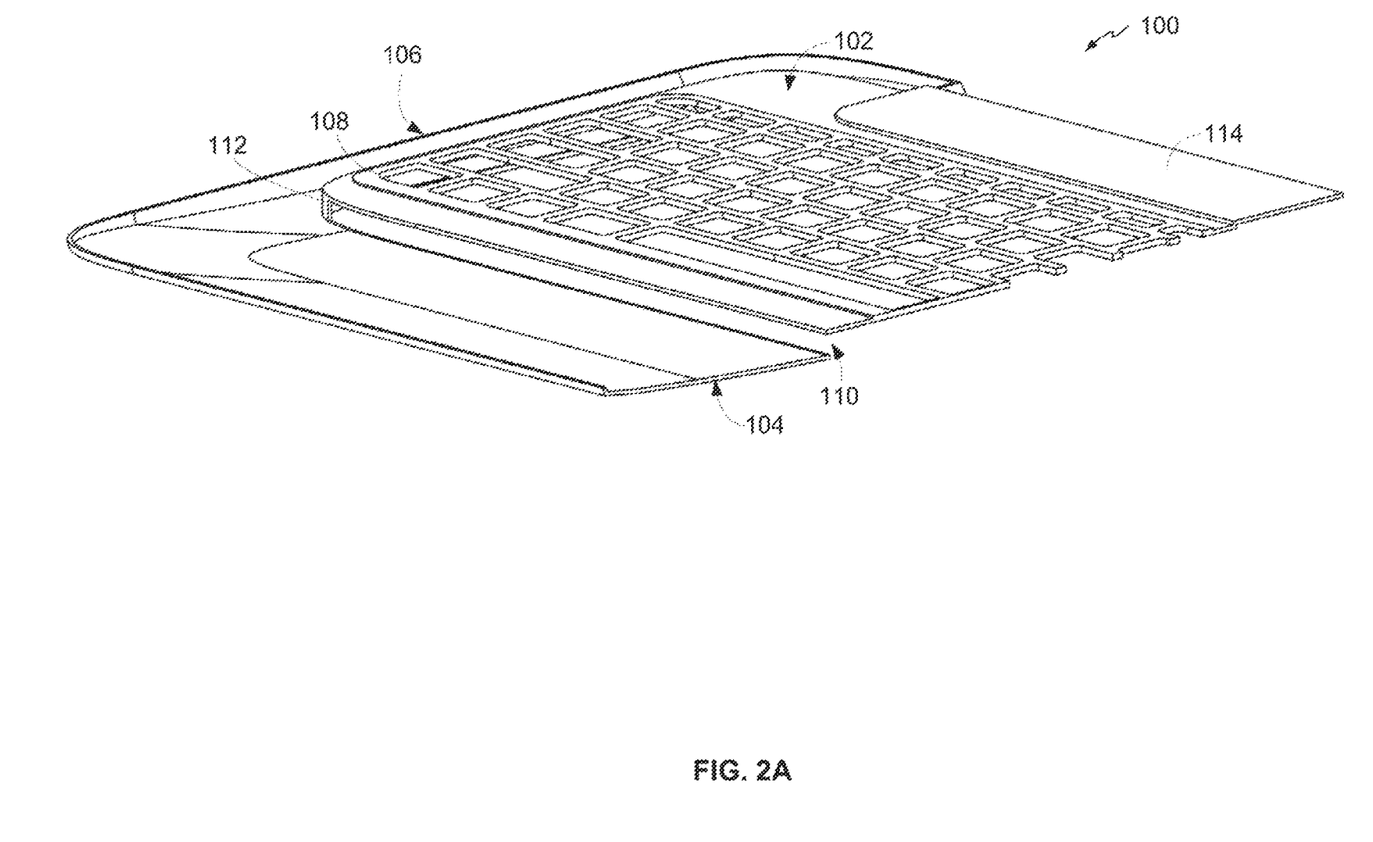
FIGS. 2A-B illustrate cross sectional views of the housing member, according to an example.
Figure 2B:
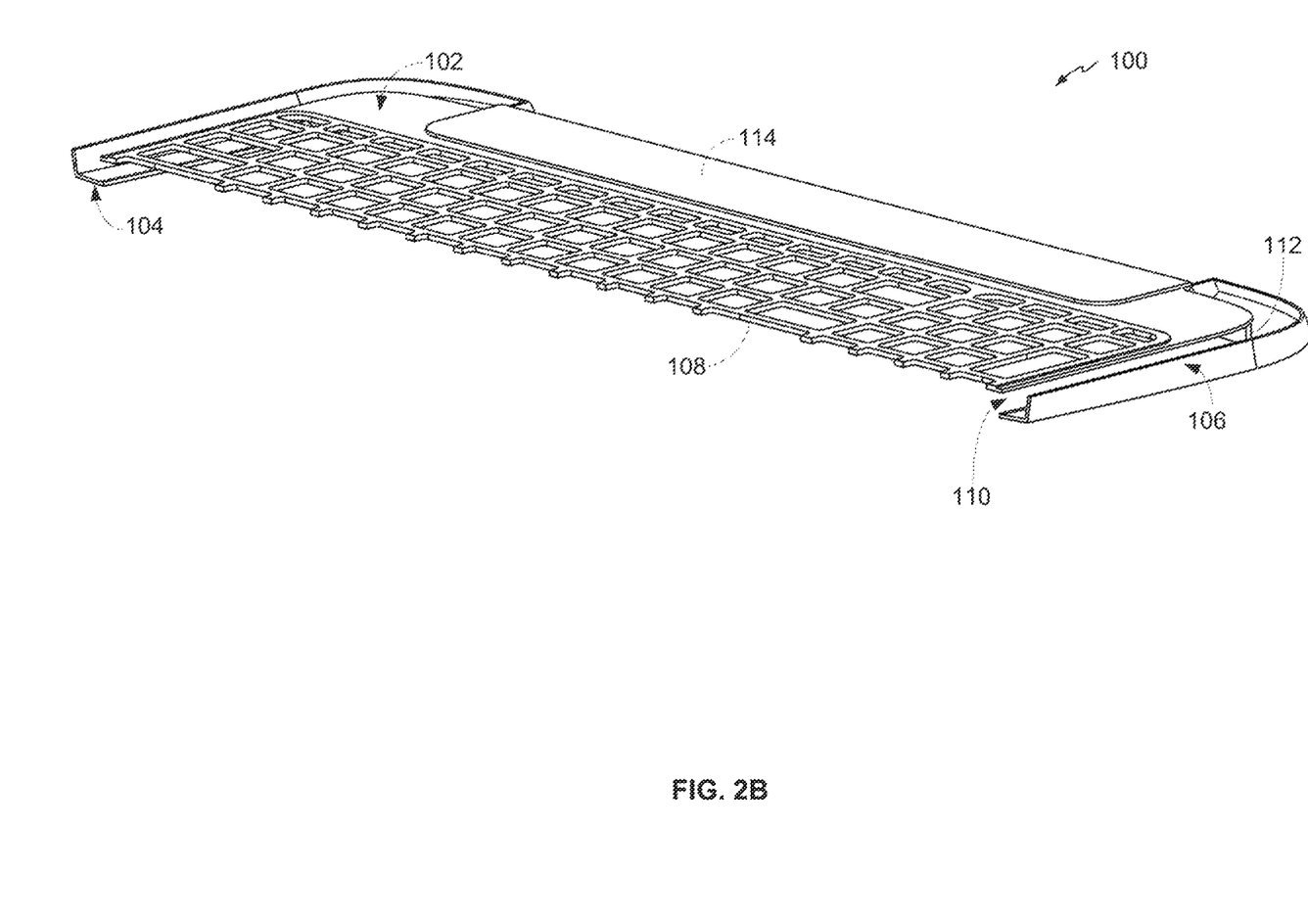

FIGS. 2A-B illustrate cross sectional views of the housing' member 100, according to an example. Referring to FIG. 2A, the volume of the cavity 110 may be determined by the height of the vertical walls 112. In addition, the height of the vertical walls 112 may match or closely match the height of the side walls 106, in an effort to keep the keyboard lattice frame 108 coplanar with the height of the side walls 106. As a result, the height of the vertical walls 112 and side walls 106 may determine the thickness of the housing member 100. FIG. 26 illustrates a cross sectional view across a length of the housing member 100, according to an example.

Figure 3A:
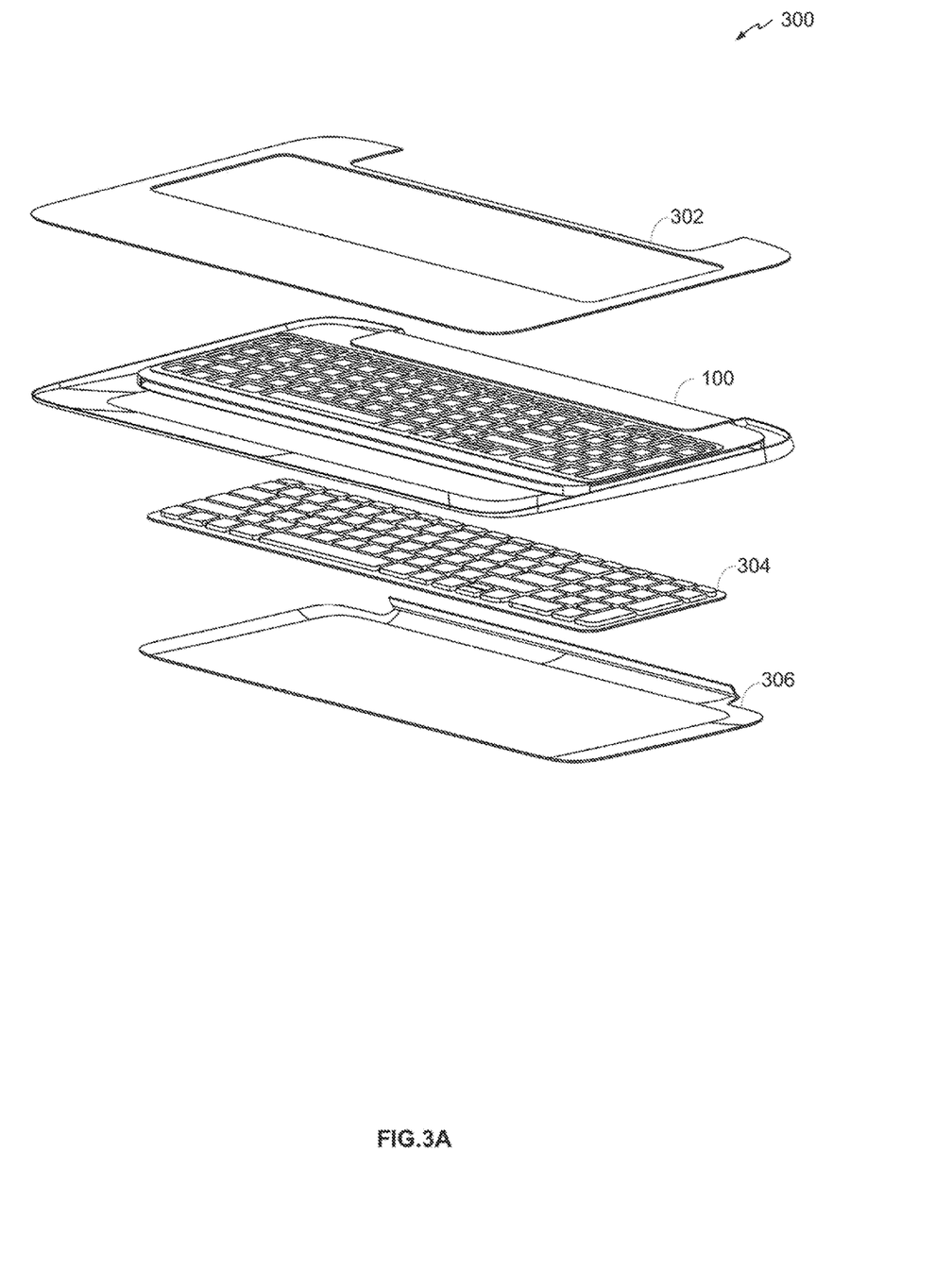
FIGS. 3A-B illustrate a base housing of a notebook computer, according to an example.
Figure 3B:
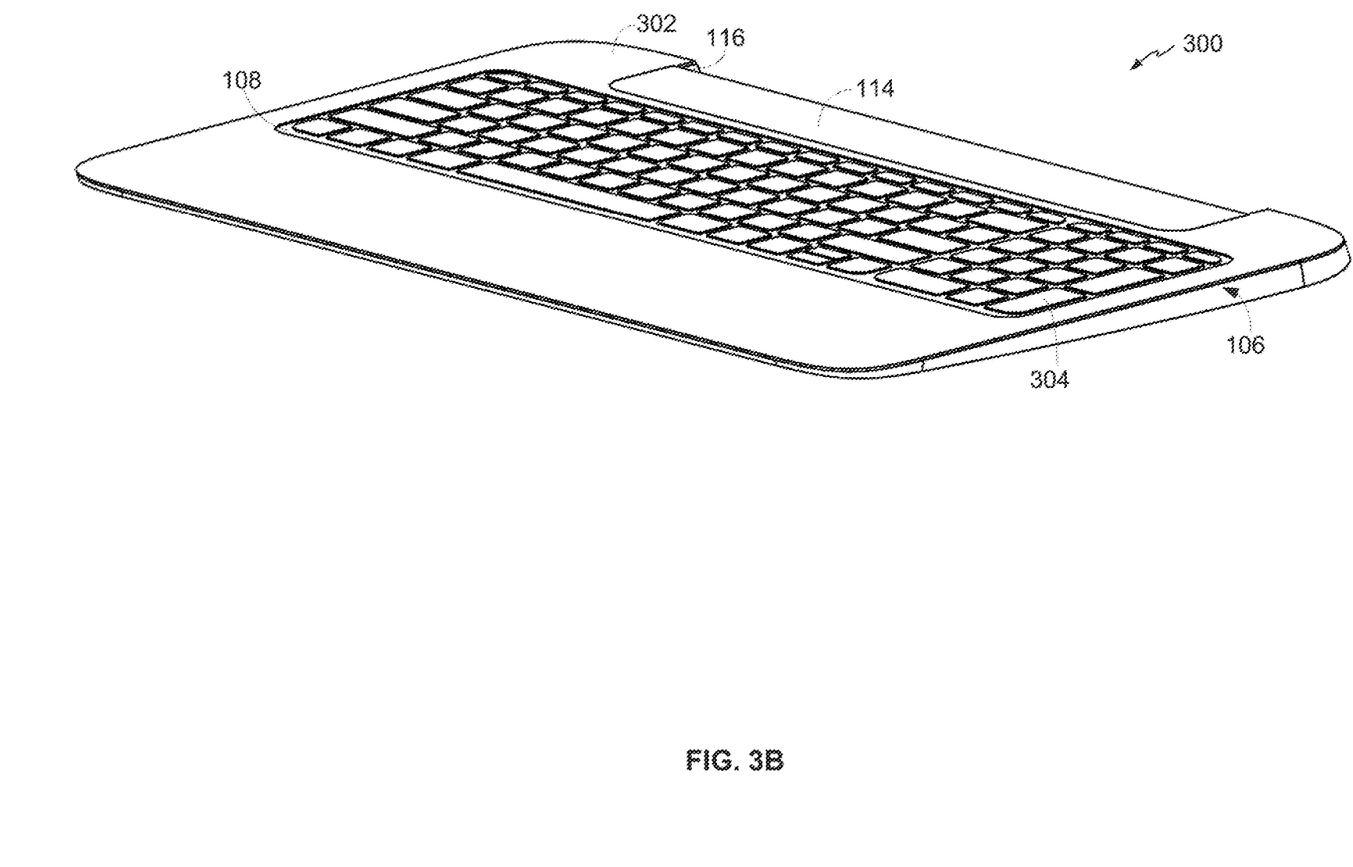

FIGS. 3A-B illustrate a base housing 300 of a notebook computer, according to an example. Referring to FIG. 3A, components of the base housing 300 are illustrated, that include the single unitary housing member 100. The housing member 100 may be configured to be the primary structural part of the base housing 300. In addition, the top surface 102, bottom surface 104, and side walls 106 of the housing member 100, which is exposed, may contribute to the aesthetics of the notebook computer by having matching finishes since a finishing process may be performed on the housing member 100 as a whole. In addition, the cavity 110 of the housing member 100 may serve as a protective shell for carrying/supporting most, if not all, of the electronics, circuitry, and other operational components of the notebook computer.

The top surface 102 of the housing member 100 may be exposed through an opening of a top covering 302 that is disposed above the housing member 100. As an example, a portion of the covering 302 may include an opening for accommodating a touchpad for the notebook computer, and the covering 302 may be formed from a plastic or metal material. A keyboard 304 may fit through the keyboard lattice frame 108 of the housing member 100. Finally, a service door 306 may enclose the cavity 110 within the housing member 100, wherein the service door 306 is coplanar with the bottom surface 104.

FIG. 3B illustrates the components of the base housing 300 assembled together. As illustrated, the keyboard lattice frame 108, speaker frame 114, and side walls 106 of the housing member 100 may be exposed to contribute to the aesthetics of the notebook computer by having matching finishes since a finishing process may be performed on the housing member 100 as a whole. The display housing of the notebook computer (not shown) may be rotatably connected to the base housing 300 at connection points 116 of the housing member 100 (e.g., via one or more hinges).

Figure 4A:
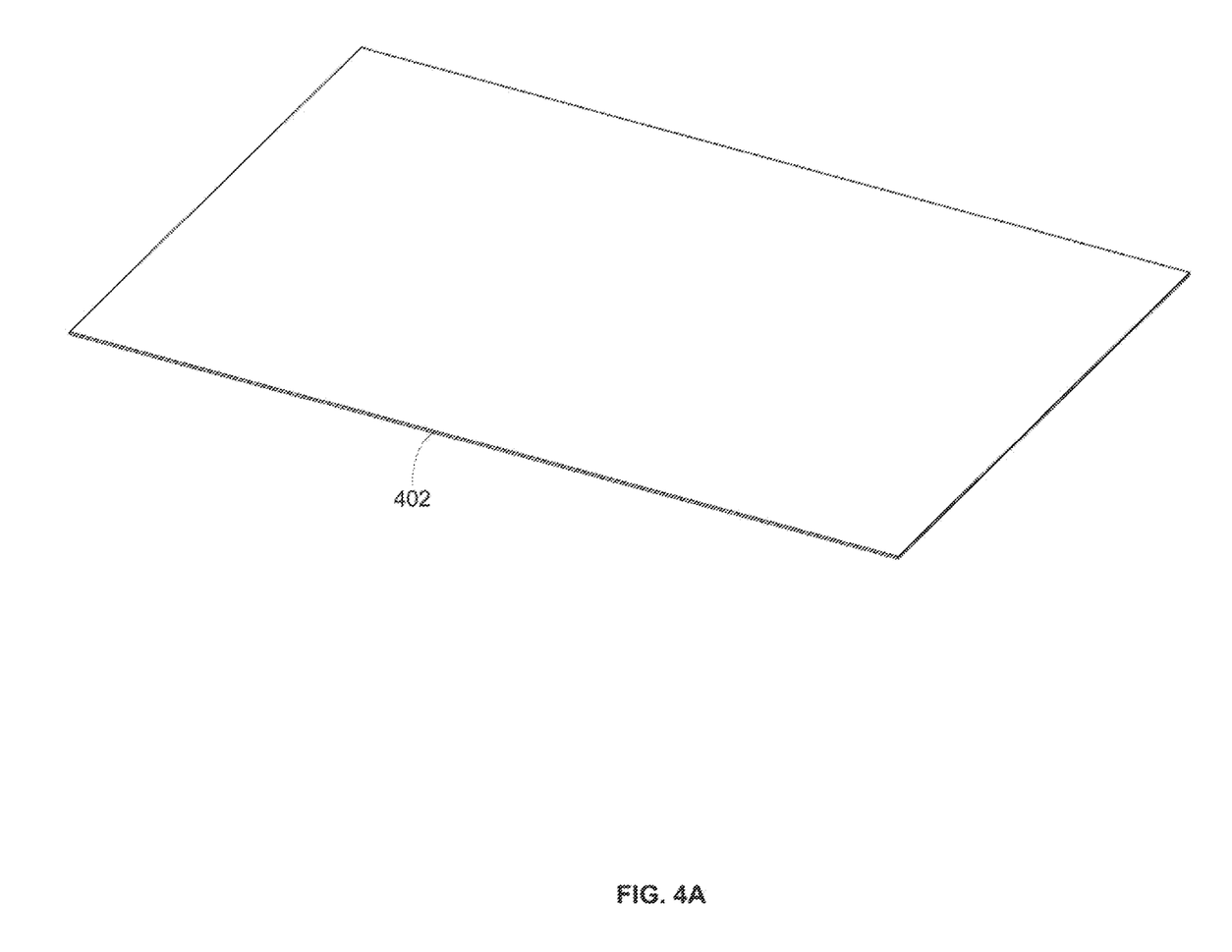
FIGS. 4A-G illustrate a process for forming a single unitary housing member, according to an example.

FIGS. 4A-G illustrate a process for forming the single unitary housing member 100, according to an example. FIG. 4A illustrates a piece of sheet metal 402 that may be used for forming the housing member 100. The sheet metal 402 is not limited to any particular metal or thickness. However, factors that may be considered when choosing a metal include, but are not limited to, the weight and ductility of a metal. Examples of metal that may be used include, but are not limited to aluminum, stainless steel, or magnesium. Aluminum may be used due to its light weight and the fact that it is structurally strong, which are important factors for portable devices. In addition, aluminum is easily formable and offers a superior corrosion resistance. Aluminum may be finished using a variety of methods including, but not limited to, mechanical and chemical prefinishes, anodic coatings, paints, and electroplated finishes.

Figure 4B:
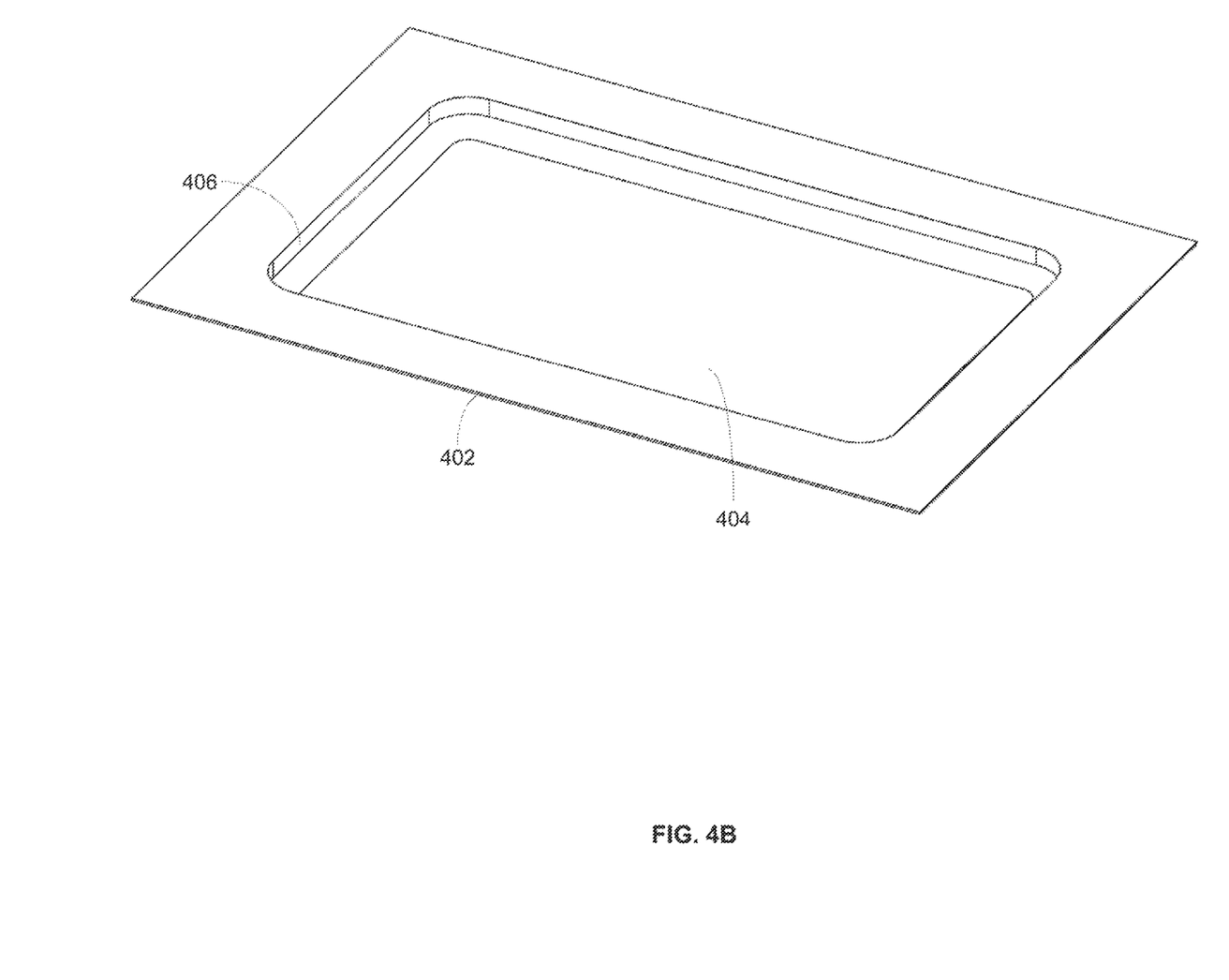

FIG. 4B illustrates a bottom portion that is formed within the piece of sheet metal 402, according to an example. A stamping process may he applied to the sheet metal 402 to form the bottom portion that includes at least a bottom surface 404 and side walls 406, which will become the bottom surface 104 and side walls 106, respectively, of the housing member 100 (see FIG. 1). The stamping process may be performed by a sheet metal forming manufacturing process. For example, a machine press may be used for changing the shape of the sheet metal 402 by the application of pressure.

As an example, a metalworking machine tool, such as a stamping press, may be used to form the bottom portion within the sheet metal 402 by deforming the sheet metal 402 with a die that is customized to form the bottom portion illustrated in FIG. 4B. The die may be customized to taper the height of the side walls 406, in an effort to match the tapered height of the side walls 106 of the housing member 100. The sheet metal 402 may be pressed around or onto the die. As a result, the sheet metal 402 may be reshaped to form the bottom portion without adding or removing any material In addition to forming the bottom portion illustrated in FIG. 4B, operations may be performed to form undercuts in the side walls 406.

Figure 4C:
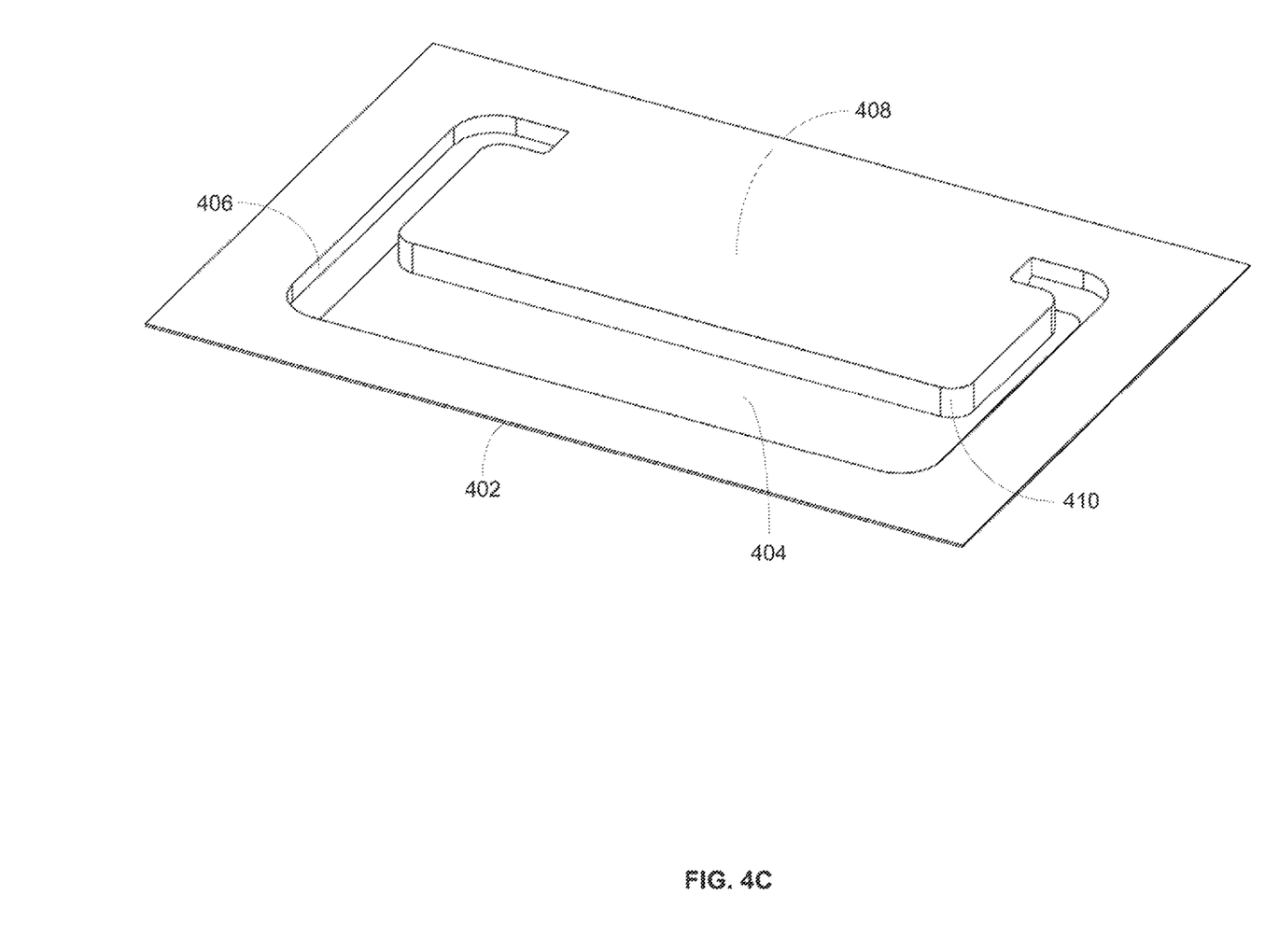

FIG. 4C illustrates a top portion that is formed within the piece of sheet metal 402, according to an example. A stamping process may be applied to the sheet metal 402 to form the top portion that includes at least a top surface 408 and vertical walls 410, which will become the top surface 102 and vertical walls 112, respectively, f the housing member 100 (see FIG. 1). The stamping process may be performed by a sheet metal forming manufacturing process, as described above with reference to FIG. 4B.

The stamping processes performed to form the cavities illustrated in FIGS. 4B-C may be performed in a single stage operation, or could occur through a series of stages. In a single stage operation, both cavities illustrated in FIG. 4C may be formed by a machine press in a single stroke. As an example, the die mounted on the machine press may be customized to form both the top portion and the bottom portion within the sheet metal 402 in a single stroke. Rather than forming the cavities in a single stroke, the bottom portion illustrated in FIG. 4B may be formed in a first stage, and the top portion illustrated in FIG. 4C may be formed in a second stage. The first and second stages may be performed in different machine presses that have dies customized to form each cavity.

Referring to FIG. 4C, the top surface 408 is a portion of the sheet metal 402 pushed up from the bottom surface 404. In addition, the height of the vertical walls 410 may match or closely match the height of the side walls 406, in an effort to keep the top surface 408 coplanar with the height of the side walls 406. As a result, the height of the vertical walls 410 and side walls 406 may determine the thickness of the housing member 100.

Figure 4D:
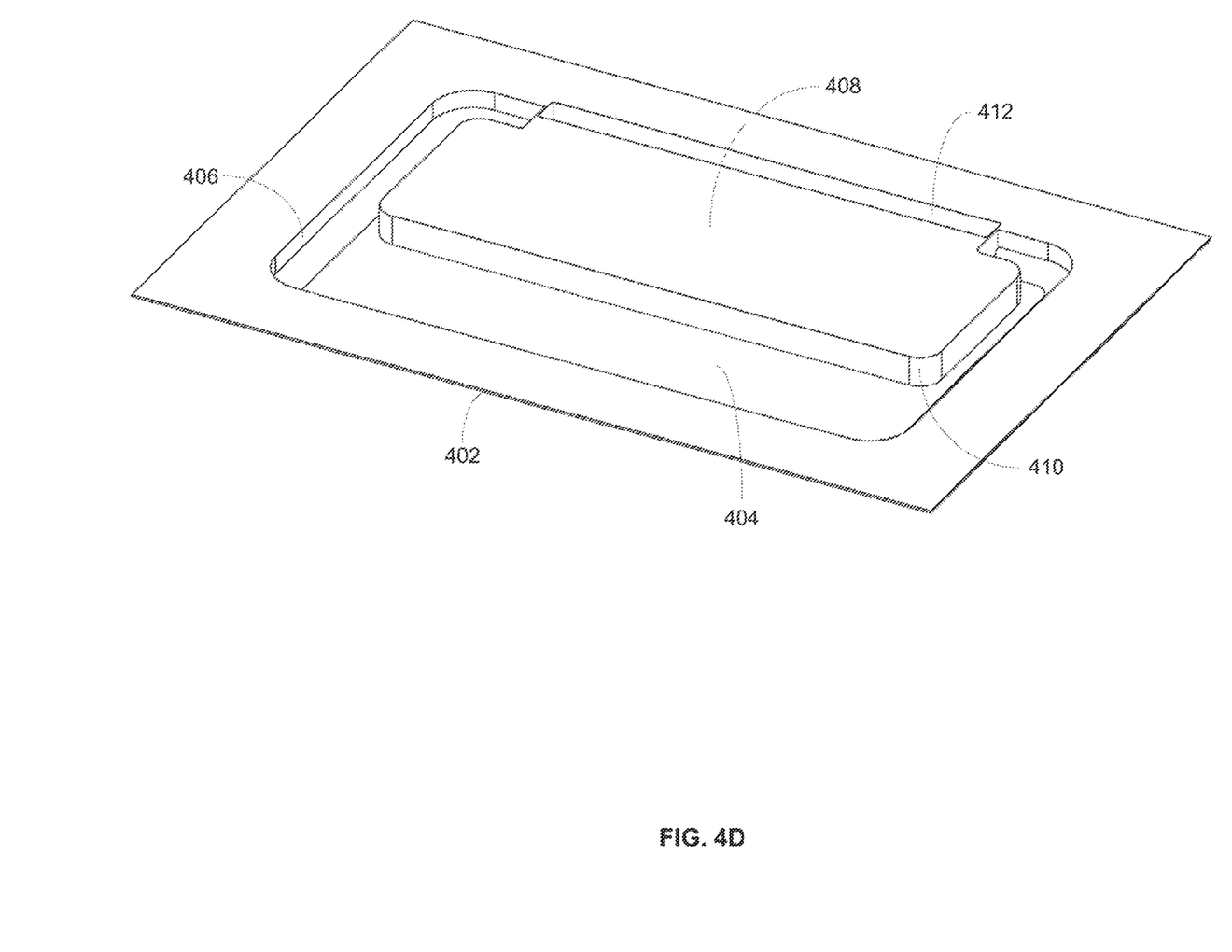
Figure 4E:
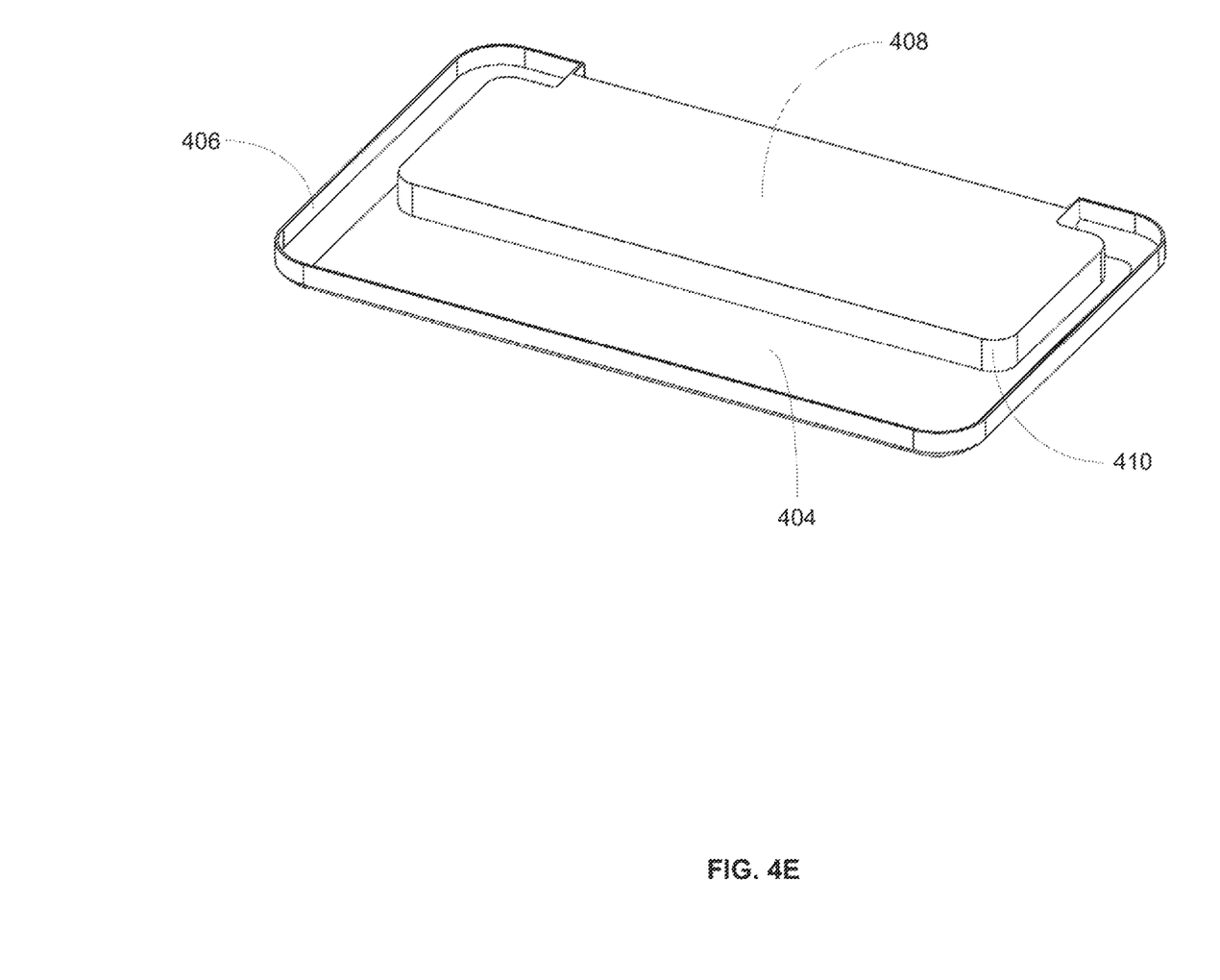

FIG. 4D illustrates a portion 412 of the top surface 408 that is removed, according to an example. The portion 412 may be removed by a machine tool, such as a punching machine. The portion of vertical walls 410 that is exposed upon removing portion 412 will accommodate the connection points 116 of the housing member 100 (see FIG. 1). Referring to FIG. 4E, an unused portion of the sheet metal 402 may be removed or punched out for forming the housing member 100.

Figure 4F:
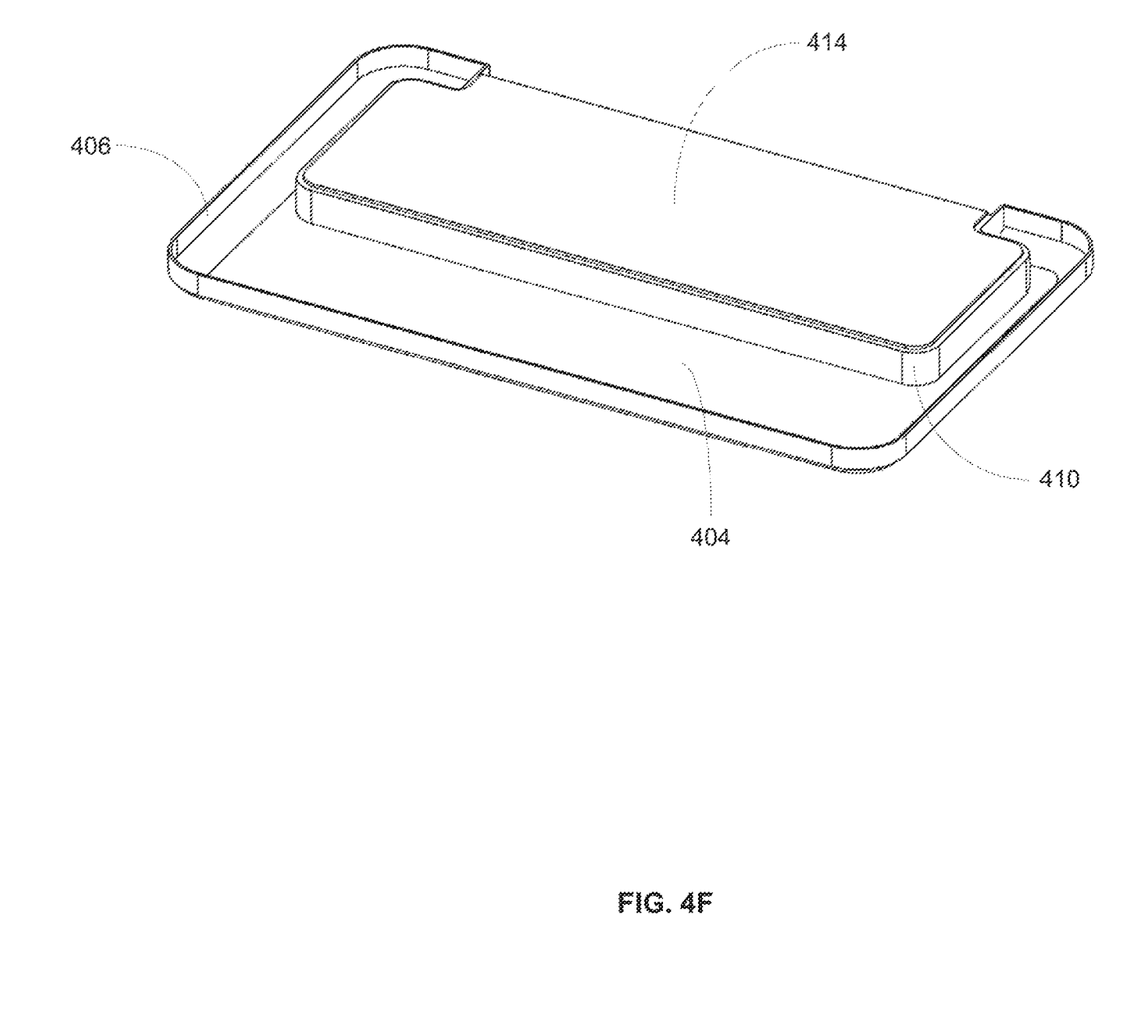

Referring to FIG. 4F, operations may be performed on the top surface 408 of the sheet metal 402 to form various features 414, which include at least the keyboard lattice frame 108 and speaker frame 114 of the single unitary housing member 100 (see FIG. 1). The features 414 may be formed from sheet metal forming manufacturing processes, such as coining and punching. Alternative cutting operations may also be used such as a machining operation that cuts holes through the top surface 408. With regards to the speaker frame 114, speaker openings may be formed in the top surface 408 or another area of the sheet metal 402 by creating an array of small openings in the surface of the sheet metal 402. Depending on the size, machining operations or other cutting operations, such as laser cutting, may be used to form the speaker openings.

Figure 4G:
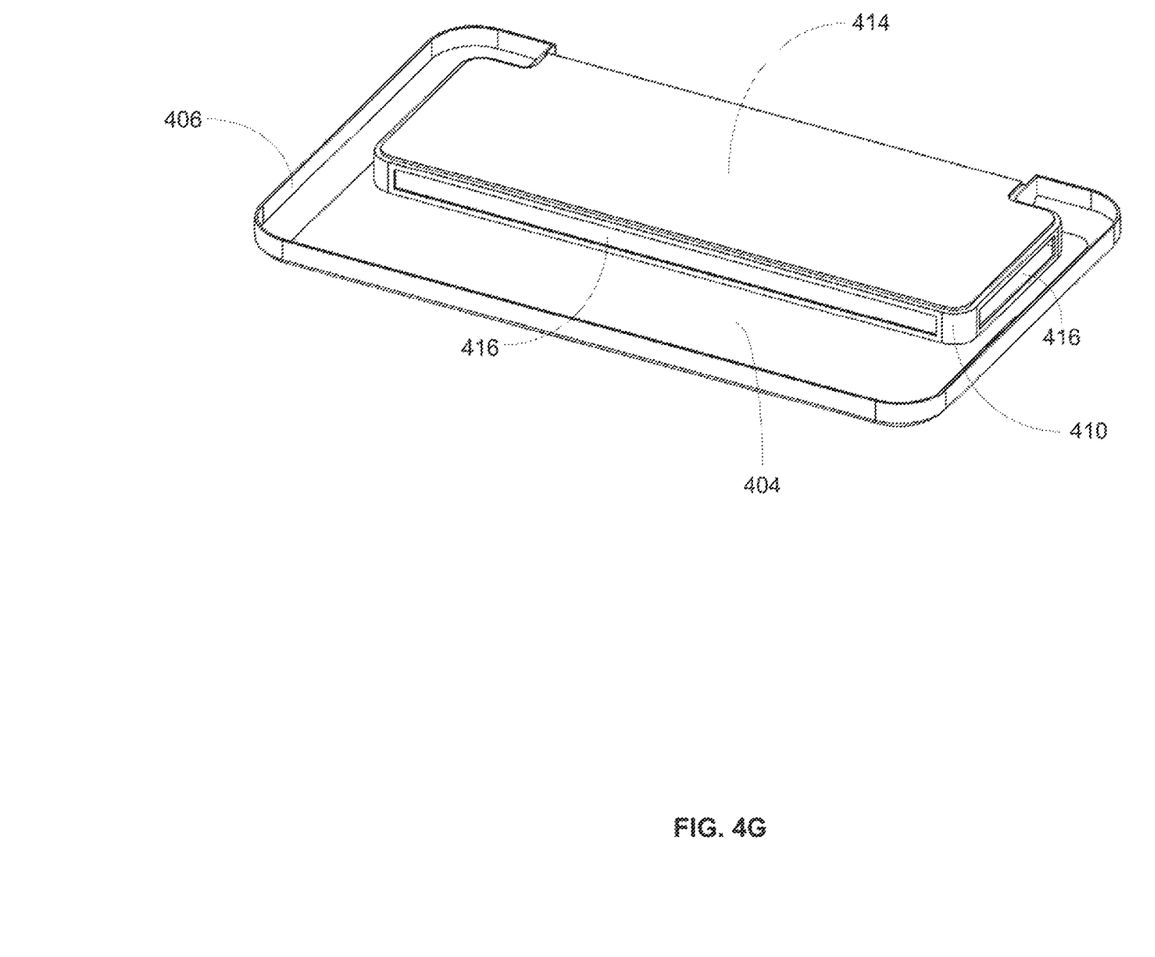

Referring to FIG. 4G, openings 416 may be made in the vertical was 410 to expose a cavity below the top surface 408, which will become the cavity 110 below the top surface 102 (see FIG. 1). Although not illustrated, the top surface 408, bottom surface 404, and side walls 406 may include a plurality of individual openings for various purposes. For example, the side walls 406 may be configured to carry various ports to which cables/connections can be connected. Buttons and other controls may also be situated within the top surface 408. These may be situated within openings in the top surface 408. As an example, the various openings may be formed via a machining operation that cuts holes through the sheet metal 402. Alternative cutting operations may also be used in place of or in combination with the machining operation. One or more computer numerical control (CNC) machine tools may be used to perform some or all of the machining operations.

After forming a single unitary housing member 100 from a piece of sheet metal 402, finishing operations may be performed. The finishing operations performed may be dependent on the metal used to form the housing member 100. In the case of aluminum, the finishing operations may include anodizing. By performing the finishing operations on the housing member 100 as a whole, the finishes of the different surfaces of the housing member 100 may match, which contribute to the aesthetics of the computing device.

Figure 5:
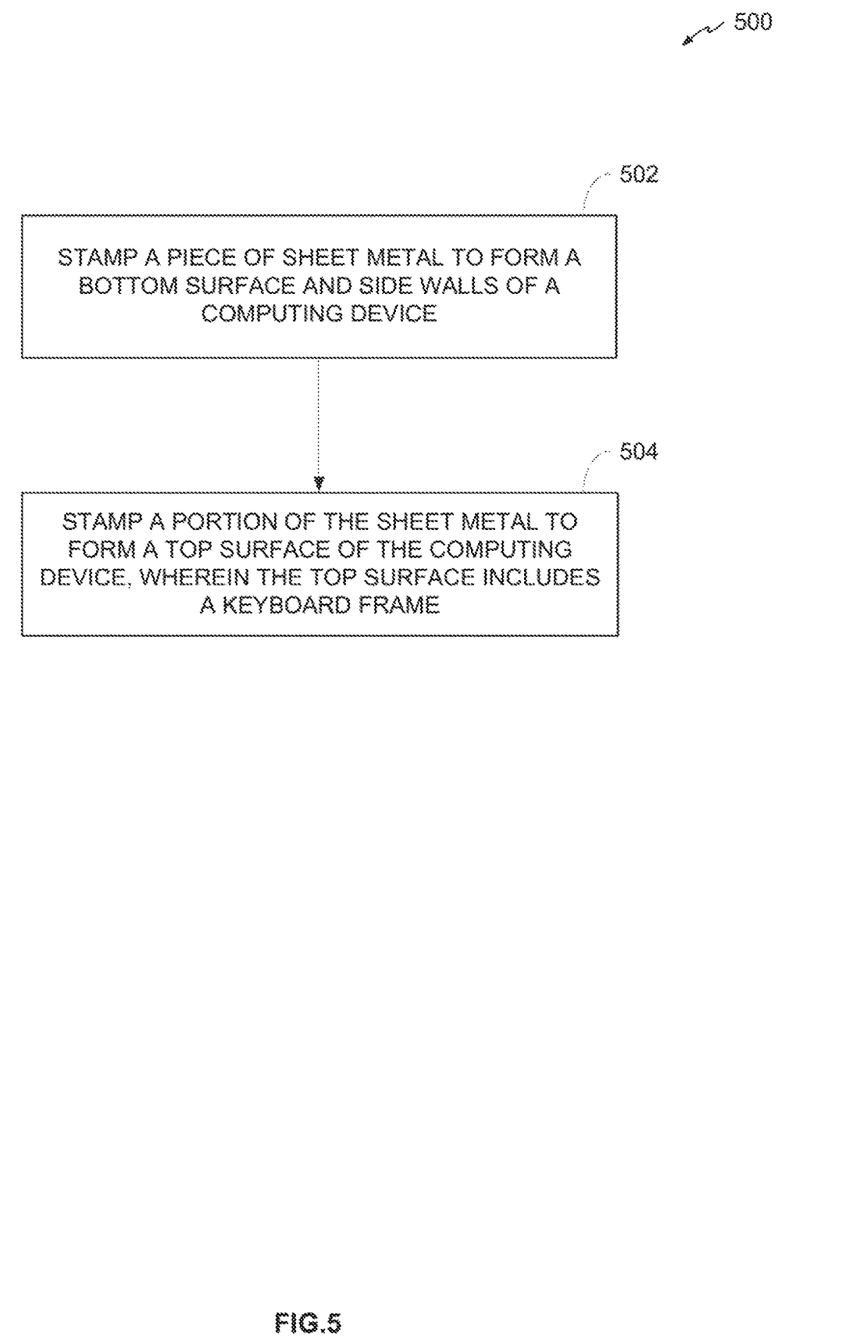
FIG. 5 is a flow diagram in accordance with an example of the present disclosure.

Referring to FIG. 5, a flow diagram is illustrated in accordance with various examples. The flow diagram illustrates processes of forming a single unitary housing member of a computing device in a particular order. The order of the processes is not meant to limit the disclosure. Rather, it is expressly intended that one or more of the processes may occur in other orders or simultaneously. The disclosure is not to be limited to any particular example.

A method 500 may begin and progress to 502, where a piece of metal sheet is stamped to form a bottom surface and side walls of the computing device. FIG. 4B illustrates a stamping process that may be applied to sheet metal 402 to form a cavity that includes at least a bottom surface 404 and side walls 406, which will become the bottom surface 104 and side walls 106, respectively, of the housing member 100 (see FIG. 1).

Progressing to 504, a portion of the sheet metal may be stamped to form a top surface of the computing device. As an example, the top surface of the computing device may include a keyboard frame. Stamping the portion of the sheet metal to form the top surface may include pushing the portion of the sheet metal up from the bottom surface. Referring to FIG. 4C, a stamping process may be applied to the sheet metal 402 to form another other cavity that includes at least a top surface 408, which will become the top surface 102 of the housing member 100 (see FIG. 1). An area between the top surface and the bottom surface may include a cavity that is configured to enclose a plurality of components of the computing device. A finishing operation may be applied to the single unitary housing member 100, such that a finishing of the top surface may match a finishing of the bottom surface.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A portable computing device, comprising:
   a display housing; and
   a base housing to which the display housing is rotatably connected, wherein the base housing includes a single unified housing member that forms a bottom surface of the base housing, side walls, and a top surface of the base housing, wherein the top surface of the base housing is a portion of the single unified housing member pushed up from the bottom surface of the base housing.

2. The portable computing device of claim 1, wherein an area between the top surface and the bottom surface of the base housing defines a cavity configured to enclose a plurality of components of the portable computing device.

3. The portable computing device of claim 1, comprising a plurality of individual openings within one or more of the top surface, the bottom surface, and the side walls of the base housing.

4. The portable computing device of claim 1, wherein a finish of the top surface matches a finish of the bottom surface.

5. A base housing for a notebook computer, comprising:
   a single unified housing member, comprising:
      a bottom portion and side walls that form a bottom surface and side walls of the base housing; and
      a top portion that forms a top surface of the base housing, wherein the bottom portion, the top portion, and the side walls of the housing member are formed from a single piece of sheet metal, wherein the top portion of the housing member is a portion of the housing member pushed up from the bottom portion of the housing member.

6. The base housing of claim 5, wherein an area between the top portion and the bottom portion of the housing member defines a cavity configured to enclose a plurality of components of the notebook computer.

7. The base housing of claim 5, comprising a plurality of individual openings within one or more of the top portion, the bottom portion, and the side walls of the housing member.

8. The base housing of claim 5, wherein a finish of the top surface of the base housing matches a finish of the bottom surface of the base housing.

9. A method of forming a single unified housing member of a computing device, the method comprising:

stamping a piece of sheet metal to form a bottom surface and side walk of the computing device; and pushing a portion of the sheet metal up from the bottom surface to form a top surface of the computing device, wherein the top surface includes a keyboard frame.

10. The method of claim 9, wherein an area between the top surface and the bottom surface defines a cavity configured to enclose a plurality of components of the computing device.

11. The method of claim 9, comprising:

machining a plurality of individual openings within one or more of the top surface, the bottom surface, and the side walls.

12. The method of claim 9, comprising:

applying a finishing operation to the single unified housing member, wherein a finishing of the top surface matches a finishing of the bottom surface.

* * * * *

UNITED STATES PATENT AND TRADEMARK OFFICE
CERTIFICATE OF CORRECTION

PATENT NO. : 9,857,830 B2
APPLICATION NO. : 14/786351
DATED : January 2, 2018
INVENTOR(S) : Senatori

Page 1 of 1

It is certified that error appears in the above-identified patent and that said Letters Patent is hereby corrected as shown below:

In the Claims

In Column 7, Line 2, Claim 9 delete "walk" and insert -- walls --, therefor.

Signed and Sealed this
Twenty-fourth Day of July, 2018

Andrei Iancu
*Director of the United States Patent and Trademark Office*